United States Patent
Hatade et al.

(10) Patent No.: US 7,292,397 B2
(45) Date of Patent: Nov. 6, 2007

(54) BEAM-SHAPING OPTICAL ELEMENT AND METHOD AND PROGRAM FOR DESIGNING THE SAME

(75) Inventors: Kouei Hatade, Mishima-Gun (JP); Petrus Theodorus Jutte, Eindhoven (NL); Jacobus Maria Antonius Van Den Eerenbeemd, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 225 days.

(21) Appl. No.: 10/532,921

(22) PCT Filed: Nov. 3, 2003

(86) PCT No.: PCT/IB03/04887

§ 371 (c)(1),
(2), (4) Date: Apr. 27, 2005

(87) PCT Pub. No.: WO2004/040338

PCT Pub. Date: May 13, 2004

(65) Prior Publication Data

US 2006/0103907 A1   May 18, 2006

(30) Foreign Application Priority Data

Nov. 1, 2002   (JP) .............................. 2002-320115

(51) Int. Cl.
*G02B 3/02* (2006.01)
*G11B 7/00* (2006.01)

(52) U.S. Cl. .................. 359/718; 369/112.23; 359/668

(58) Field of Classification Search ................... None
See application file for complete search history.

(56) References Cited

U.S. PATENT DOCUMENTS

| 4,915,484 | A | 4/1990 | Yamamoto |
| 5,067,067 | A | 11/1991 | Estelle et al. |
| 5,283,694 | A | 2/1994 | Frady |
| 5,661,607 | A | 8/1997 | Katsuma |

FOREIGN PATENT DOCUMENTS

| JP | 06274931 A | 9/1994 |
| JP | 06294940 A | 10/1994 |
| JP | 09167375 A | 6/1997 |
| JP | 2001006202 A | 1/2001 |
| JP | 2001160234 A | 6/2001 |

*Primary Examiner*—James Phan
(74) *Attorney, Agent, or Firm*—Michael E. Belk

(57) ABSTRACT

A beam-shaping optical element employing an aspherical profileis presented to minimize aberration. A beam-shaping optical element according to the present invention includes an entrance surface and the exit surface, both having a non-circular cross-section in any plane comprising the optical axis. A beam-shaping optical element according to one embodiment of the present invention, has the optical axis coinciding with the Z-axis of a three-axis rectangular XYZ system of coordinates, and the entrance surface and/or the exit surface represented by a mathematical equation comprising a term representing a non-rotationally symmetric aspherical profile, at least one correction term comprising a function of variable X alone and at least one correction term comprising a function of variable Y alone.

13 Claims, 10 Drawing Sheets

BEAM-SHAPING OPTICAL ELEMENT AND METHOD AND PROGRAM FOR DESIGNING THE SAME

FIELD OF THE INVENTION

The present invention relates to a beam-shaping optical element used in optical pick-up systems for optical storage applications like compact discs (CD), digital versatile discs (DVD) or the like, in optical communication systems and in other fields. The present invention has a wide range of beam-shaping applications, including those for coupling of a beam to an optical fiber and those in laser beam printers, scanners, apparatuses for laser machining, high efficient LD optical systems for diode-pumped solid-state lasers and other apparatuses employing optical systems.

BACKGROUND OF THE INVENTION

FIG. 5 shows a schematic layout of an optical pick-up system. Light emitted by a semiconductor laser 1 is converted into a parallel beam by collimator 2. The light is then reflected by a folding mirror 3 and led to objective lens 4, which focuses the light onto an optical information-recording medium 5 for recording and reproducing information.

The field pattern of the light emitted by the semiconductor laser 1 is elliptical as shown in FIG. 7, where the major axis is perpendicular to the layer direction (face of junction). In other words, the light beam has its energy elliptically distributed in a cross-section of the beam. In case of a usual semiconductor laser for recording applications, the FWHM (full width at half maximum) is approximately 8.5 degrees in the layer direction and approximately 17 degrees in the direction perpendicular to the layer direction. In the direction perpendicular to the layer direction (face of junction), the outer of the light from the semiconductor laser 1 may not couple to the collimator lens 2 and is not converted into a parallel beam, thus resulting in loss of light into the optics. Further, the cross-section of the light converted into a parallel beam has an elliptical energy distribution. If the light is focused onto the surface of the optical information-recording medium 5 as an optical spot, the optical spot is also elliptical.

Accordingly, various techniques have been developed so far to shape the light emitted by semiconductor lasers, with an elliptical energy distribution into one with a substantially circular energy distribution.

FIG. 6 shows an optical system in which prisms are combined to shape light with an elliptical cross-section into one with a substantially circular cross-section. The optical system using prisms has the drawbacks that it is large in size, expensive and troublesome in assembling operation. Further, the system may produce additional aberrations. A parallel beam is necessary for the operation of the prisms and a large numerical aperture for the collimator is required.

Another technique has been developed, in which a folding mirror is used for beam shaping. For example, refer to Japanese unexamined patent publication No. 9-167375. In this case, the mirror for beam-shaping is arranged behind a collimator lens, so that a distance between the mirror for beam-shaping and the semiconductor laser is lager. Accordingly, a large numerical aperture for the collimator is required.

Still another technique has been developed, in which an aspherical lens having different focal lengths in two directions perpendicular to the optical axis, is used for beam-shaping. Japanese unexamined patent publications No. 6-274931 and No. 6-294940 disclose techniques in which a toroidal lens is used as the aspherical lens. Further, Japanese unexamined patent publications No. 2001-6202 and No. 2001-160234 disclose techniques in which a lens having an anamorphic surface, to be described below, is used. In any of the above-mentioned techniques, one surface or both surfaces of the collimator lens are made aspherical for a beam-shaping function.

A toroidal surface as a aspherical surface can be obtained by defining a profile by Equation (1) shown below and rotating the profile around the axis parallel to X axis and passing through the point on Z axis, distant by $R_y$ from the origin. The shape is spherical in Y-Z plane and aspherical in X-Z plane.

$$Z(x) = \frac{c_x x^2}{1 + \sqrt{1 - (1+k)c_x^2 x^2}} + \sum_{i=1}^{m} A_i x^{2i} \quad (X\text{-}Z \text{ plane}) \qquad \text{Eq. (1)}$$

$c_x$ is the curvature of a curve in the X-Z plane and $R_y$ is a radius of a curve (circle) in the Y-Z plane. The second and succeeding terms are correction terms representing a deviation from the surface represented by the first term.

An anamorphic surface can be represented by Equation (2) shown below.

$$Z = \frac{c_x x^2 + c_y y^2}{1 + \sqrt{1 - (1+k_x)(c_x^2 x^2) - (1+k_y)(c_y^2 y^2)}} + \qquad \text{Eq. (2)}$$
$$AR[(1-AP)x^2 + (1+AP)y^2]^2 +$$
$$BR[(1-Bp)x^2 + (1+BP)y^2]^3 +$$
$$CR[(1-CP)x^2 + (1+CP)y^2]^4 +$$
$$DR[(1-DP)x^2 + (1+DP)y^2]^5$$

where $c_x$ is the curvature of a curve in the X-Z plane and equals $1/R_x$ and $c_y$ is curvature of a curve in the Y-Z plane and equals $1/R_y$. The second and succeeding terms are correction terms representing a deviation from the surface represented by the first term. AR, BR, CR, DR, AP, BP, CP and DP are correction coefficients (constants).

In an optical pick-up system in compact discs (CD), digital versatile discs (DVD) or the like, the aberrations must be minimized for accurate and high-speed recording and reproducing. Accordingly, the aberrations for the above-mentioned lenses having a beam-shaping function must also be minimized.

Further, in optical communication systems using semiconductor lasers, a similar beam-shaping element is required for efficiently coupling beams emitted by a semiconductor laser to an optical fiber, for example, described in Japanese laying-open of unexamined application (KOKAI) No. 11-218649.

However, conventional beam-shaping optical elements using the above-mentioned equations (1) and (2) for the aspherical surfaces do not always lead to satisfactory results for minimization of aberrations.

Accordingly, there is a need to use a different description of the lens surface in order to minimize the aberrations of a beam-shaping optical element using an aspherical surface.

SUMMARY OF THE INVENTION

In a beam-shaping optical element according to the present invention, both the entrance surface and the exit surface have a non-circular cross-section in any plane comprising the optical axis.

In a beam-shaping optical element according to the present invention, having an entrance surface, an exit surface located opposite thereto and an optical axis, the optical axis coincides with the Z-axis of a three-axis rectangular XYZ system of coordinates, and at least one of the entrance surface and the exit surface is represented by a mathematical equation comprising a term representing a non-rotationally symmetric aspherical profile and correction terms, each correction term being a function of either variable X or Y, at least one of the correction terms being a function of variable X and at least one of the correction terms being a function of variable Y. Hence, the equation does not comprise a correction term being a function of both variable X and variable Y and it does comprise at least one correction term comprising a function of variable X alone and at least one correction term comprising a function of variable Y alone. The beam shaping element may have one of the surfaces or both surfaces designed according to the mathematical equation.

Accordingly, correction in X direction and that in Y direction can be made independently over the aspherical profile, permitting more flexibility in designing the element.

In a special embodiment the beam-shaping optical element at least one of the entrance surface and the exit surface has a non-circular cross-section in any plane comprising the optical axis.

In a beam-shaping optical element according to one embodiment of the present invention, the at least one correction term comprising a function of variable X alone comprises a power of X, multiplied by a correction factor and the at least one correction term comprising a function of variable Y alone comprises a power of Y, multiplied by a correction factor. Accordingly, correction in the X direction and that in the Y direction can be made independently over the aspherical profile, permitting easier correcting operations.

In a special embodiment the correction factors of the correction terms having the same powers of X and Y are the same.

In a beam-shaping optical element according to another embodiment of the present invention, at least one of the entrance surface and the exit surface is represented by the equation $$Z = \frac{c_x x^2 + c_y y^2}{1 + \sqrt{1 - (1+k_x)(c_x^2 x^2) - (1+k_y)(c_y^2 y^2)}} + \sum_{i=1}^{m} A_i x^{2i} + \sum_{i=1}^{m} B_i y^{2i} \quad \text{Eq. (3)}$$

in which $c_x$ and $c_y$ are the curvature of the surface in the direction of the X axis and Y axis, respectively, and $k_x$, $k_y$ and the correction factor $A_i$ and $B_i$ are constants. By adjusting factors in the first term, expressing the aspherical profile, beam-shaping function can be implemented. Further, by independently changing the factors of the X and Y correction terms, the aberrations of the light beam exiting the exit surface of the beam-shaping element can be minimized.

In a beam-shaping optical element according to another embodiment of the present invention, the values of $c_x$ and $c_y$ are substantially different. Accordingly, the beam-shaping optical element has different aspherical profiles in the X and Y directions.

In a beam-shaping optical element according to another embodiment of the present invention, $A_i$ is non-zero for at least one value of i and $B_j$ is non-zero for at least one value of j. Correction in the X direction and correction in the Y direction can be made independently.

In a beam-shaping optical element according to another embodiment of the present invention, at least one of the entrance and exit surfaces has a shape for minimizing the wave front aberrations of a light beam from a radiation source having passed through the beam-shaping optical element. Correction in the X direction and correction in the Y direction can be made independently over the aspherical profile, so that aberrations can be further reduced in comparison with those caused by conventional elements.

In a beam-shaping optical element according to another embodiment of the present invention, an elliptical cross-section of a beam from a semiconductor laser is converted into an almost circular cross-section.

Accordingly, when the element is used in an optical pick-up system, a more efficient transfer of energy from the semiconductor laser to the recording medium, permitting higher-speed recording and reproducing of the optical information-recording medium.

A beam-shaping optical element according to another embodiment of the present invention, is positioned between a semiconductor laser and an optical element for converting light from the semiconductor laser into parallel, diverging or converging light. Accordingly, the beam-shaping optical element can be advantageously positioned near the semiconductor laser for higher energy efficiency and better correction of aberration.

In a beam-shaping optical element according to another embodiment of the present invention, a distance from the emitting point of a semiconductor laser to the entrance surface of the element is smaller than a distance from the image of the emitting point formed by the beam-shaping optical element to the entrance surface and with the image located in the object space.

In a beam-shaping optical element according to another embodiment of the present invention, the mathematical equation $$(NA_{out}/2)(1/NA_{inx}+1/NA_{iny})<1$$

is satisfied, where $NA_{out}$ is a numerical aperture at the exit surface and $NA_{inx}$ and $NA_{iny}$ are numerical apertures at the entrance surface in the X-Z plane and Y-Z plane, respectively.

When the above conditions are satisfied, the beam-shaping optical element is provided with a pre-collimator function which decreases a difference in entry angle of the light on the mirror of such a beam-splitter or the like. Incorporating the pre-collimator function into the beam-shaping optical element reduces the number of components in the optical path. An advantage of splitting the collimation function over two elements, a pre-collimator and a post-collimator, has the advantage that the pre-collimator can be integrated with the beam-shaper to a combined element having a good thermal stability. If the entire collimation function is built into the beam-shaper, the greater optical strength of the element reduces its thermal stability. The splitting of the collimation function has the additional advantage that the post-collimator can have a relatively large focal distance, allowing an increased distance between the beam-shaper having the pre-collimator function and the post-collimator. The increased distance can be used for arranging a coupling element between the beam-shaper and the post-collimator for coupling in radiation from a further light source or coupling out light returning from the recording medium to a detection system.

Such an optical pick-up system can advantageously be used in an optical scanning device for scanning an optical recording medium. The pick-up system includes a photo detector for converting light from the optical recording medium to an electric signal representing information stored on the record carrier. The the scanning device includes an error-correction circuit connected to the electric signal. The circuit is arranged for correcting errors in the electric signal from the photo detector.

A method for designing a beam-shaping optical element according to the present invention, is directed to a beam-shaping optical element wherein the optical axis of the beam-shaping optical element coincides with the Z-axis of a three-axis rectangular XYZ system of coordinates, and at least one of the entrance surface and the exit surface of the beam-shaping optical element is represented by a mathematical equation comprising a term representing a non-rotationally symmetric aspherical profile and correction terms, each correction term being a function of either variable X or Y, at least one of the correction terms being a function of variable X and at least one of the correction terms being a function of variable Y. In the method for designing a beam-shaping optical element according to the present invention, designing is performed in such a way that aberrations are minimized The method for designing a beam-shaping optical element according to the present invention, comprises the steps of determining constraints including a vergence of the beam at the entrance surface and a vergence of the beam at the exit surface and obtaining a merit function for at least wave front aberrations. The method for designing a beam-shaping optical element according to the present invention, comprises the steps of obtaining a value for the merit function under the above constraints, determining whether or not the value of the merit function reaches a desired value, and adjusting the value of at least one correction term to cause the merit function to approach the desired value.

Accordingly, a correction term comprising a function of variable X alone and a correction term comprising a function of variable Y alone can be adjusted independently, so that aberrations can be further reduced in comparison with those caused by conventional elements.

A computer program for designing a beam-shaping optical element according to the present invention, is directed to a beam-shaping optical element wherein the optical axis of the beam-shaping optical element coincides with the Z-axis of a three-axis rectangular XYZ system of coordinates, and at least one of the entrance surface and the exit surface of the beam-shaping optical element is represented by a mathematical equation comprising a term representing a non-rotationally symmetric aspherical profile and correction terms, each correction term being a function of either variable X or Y, at least one of the correction terms being a function of variable X and at least one of the correction terms being a function of variable Y. By the method for designing a beam-shaping optical element according to the present invention, designing is performed in such a way that aberrations are minimized. The computer program for designing a beam-shaping optical element according to the present invention, has a computer perform the steps of determining constraints including a vergence of the beam at the entrance surface and a vergence of the beam at the exit surface and obtaining a merit function for at least wave front aberration. The computer program for designing a beam-shaping optical element according to the present invention, has a computer perform the steps of obtaining a value for the merit function under the above constraints, determining whether or not the value of the merit function reaches a desired value, and adjusting the value of at least one correction term to cause the merit function to approach the desired value.

Accordingly, the at least one correction term comprising a function of variable X alone and the at least one correction term comprising a function of variable Y alone can be adjusted independently, so that aberrations can be further reduced in comparison with those caused by conventional elements.

In a design method and a design program according to one embodiment of the present invention, the at least one correction term comprising a function of variable X alone comprises a power of X, multiplied by a correction factor and the at least one correction term comprising a function of variable Y alone comprises a power of Y, multiplied by a correction factor. Accordingly, correction in X direction and that in Y direction can be made independently over the aspherical profile, permitting easier correcting operations.

A design method and a design program according to another embodiment of the present invention, are directed to a beam-shaping optical element in which at least one of the entrance surface and the exit surface is represented by the equation $$Z = \frac{c_x x^2 + c_y y^2}{1 + \sqrt{1 - (1+k_x)(c_x^2 x^2) - (1+k_y)(c_y^2 y^2)}} + \sum_{i=1}^{m} A_i x^{2i} + \sum_{i=1}^{m} B_i y^{2i} \qquad \text{Eq. (3)}$$

in which $c_x$ and $c_y$ are the curvature of the surface in the direction of the X axis and Y axis, respectively, and $k_x$, $k_y$ and the correction factor $A_i$ and $B_i$ are constants. Accordingly, by adjusting factors in the first term, expressing the aspherical profile, a beam-shaping function can be implemented. Further, by independently changing factors of the X and Y correction terms, a function of minimizing wave aberration and the like can be implemented.

A method for making a beam-shaping optical element according to the present invention utilizes the method of designing the beam-shaping optical element according to the present invention. Accordingly, a beam-shaping optical element with smaller aberrations than those of conventional beam-shaping optical elements can be made.

A computer program product according to the present invention is used with a computer to implement the design method according to the present invention. Accordingly, using the computer program product according to the present invention, a beam-shaping optical element with smaller aberrations than those of conventional beam-shaping optical elements, can be designed.

DETAILED DESCRIPTION

Figure 1:
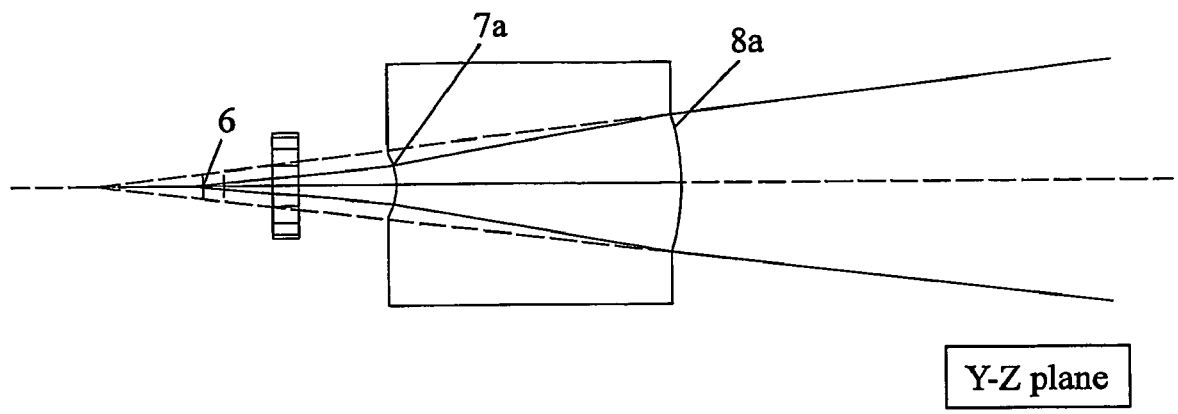
FIG. 1 shows a beam-shaping optical element according to one embodiment of the present invention.
Figure 1:
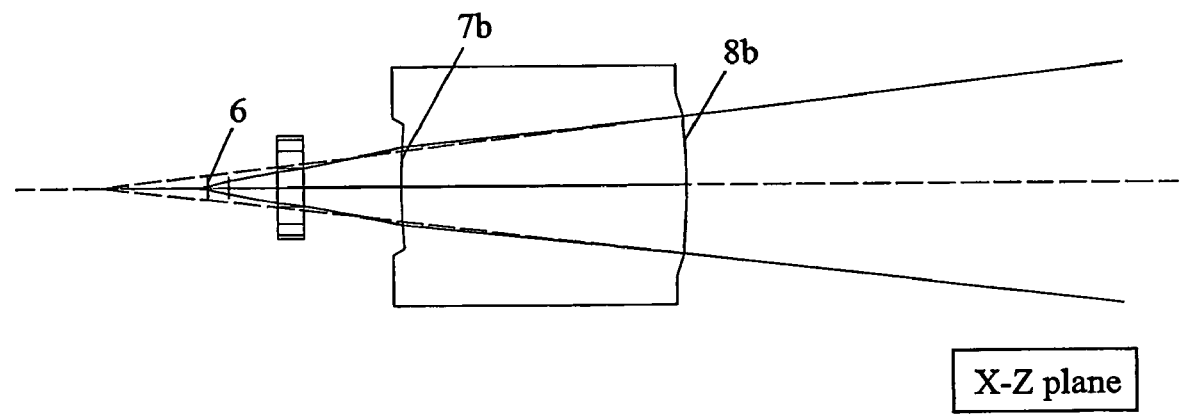

An embodiment of an optical pick-up system using a beam-shaping optical element according to the present invention will be described with reference to FIG. 2. A beam-shaping optical element 9 according to the present invention is positioned between a semiconductor laser 10 and an element 11 for converting light from the semiconductor laser 10 into parallel or converging light (for example, a collimator). An elliptical cross-section of the beam from the semiconductor laser 10 is shaped into a substantially circular cross-section when the beam passes the beam-shaping optical element. The beam-shaping optical element 9 delivers light with a diverging angle corresponding to a numerical aperture of the element 11 for converting light into parallel or converging light. The beam-shaping optical element 9 operates as a pre-collimator, the element 11 operates as a post-collimator. The light reflected on a folding mirror 12 passes through the element 11 for converting light into parallel or converging light, is focused onto an optical information-recording medium 14 by an objective system. The objective system may have one or more optical elements; the figure shows an objective system having one optical element in the form of lens 13. The beam-shaping optical element is preferably a single element.

Figure 2:
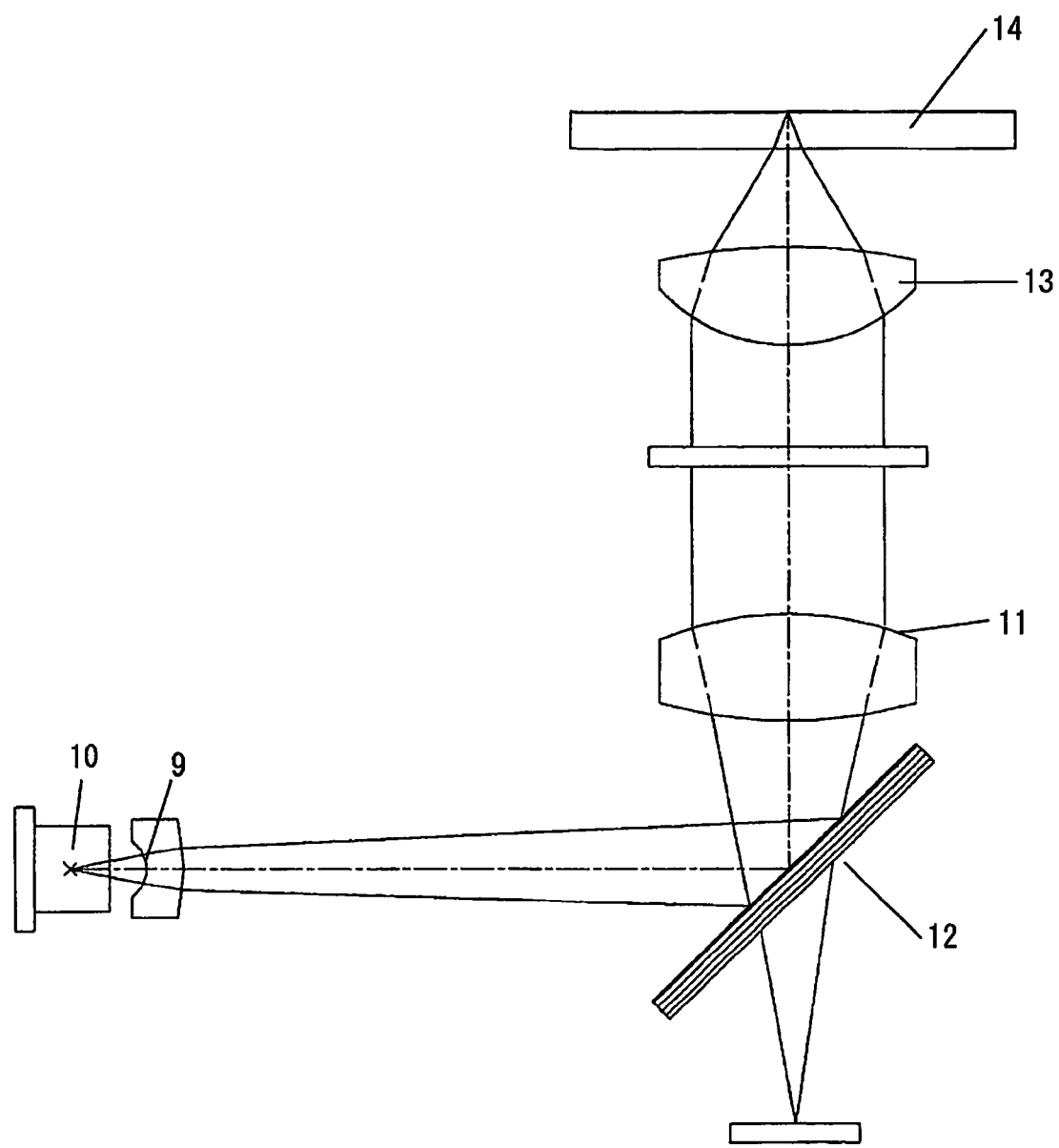
FIG. 2 shows an optical pick-up system comprising a beam-shaping optical element according to one embodiment of the present invention.

In the embodiment shown in FIG. 2, the beam-shaping optical element 9 and the element 11 for converting light into parallel or converging one (for example, a collimator lens), are provided separately. The structure of separately providing the elements has the following advantages. First, use of the collimator lens can reduce the change in aberration due to movement of the objective lens in a direction perpendicular to the optical axis. In order to reduce the change in aberration due to the movement of the objective lens, the size of the collimator lens must be large enough compared to that of the objective lens. Thus, the collimator lens must be positioned at a predetermined distance from the semiconductor laser 10. Second, the beam-shaping optical element can be advantageously positioned near the semiconductor laser, for better correction of aberration, even though the collimator lens must be positioned at the predetermined distance from the semiconductor laser.

Thus, in the structure of the embodiment, the beam-shaping optical element 9 and the element 11 for converting light into parallel or converging one, are separately provided. However, the present invention can similarly be applied to an integral-type element in which a beam-shaping function and a function of converting light into parallel or converging one are provided.

A beam-shaping optical element according to the present invention may be provided with a pre-collimator function, which reduces a diverging angle of light exiting the element. When such a beam is incident on a beam splitter arranged after the element, the beam will have smaller angles of incidence an a mirror coating or anti-reflex coating of the beam splitter, which simplifies the design of the coatings.

Figure 3:
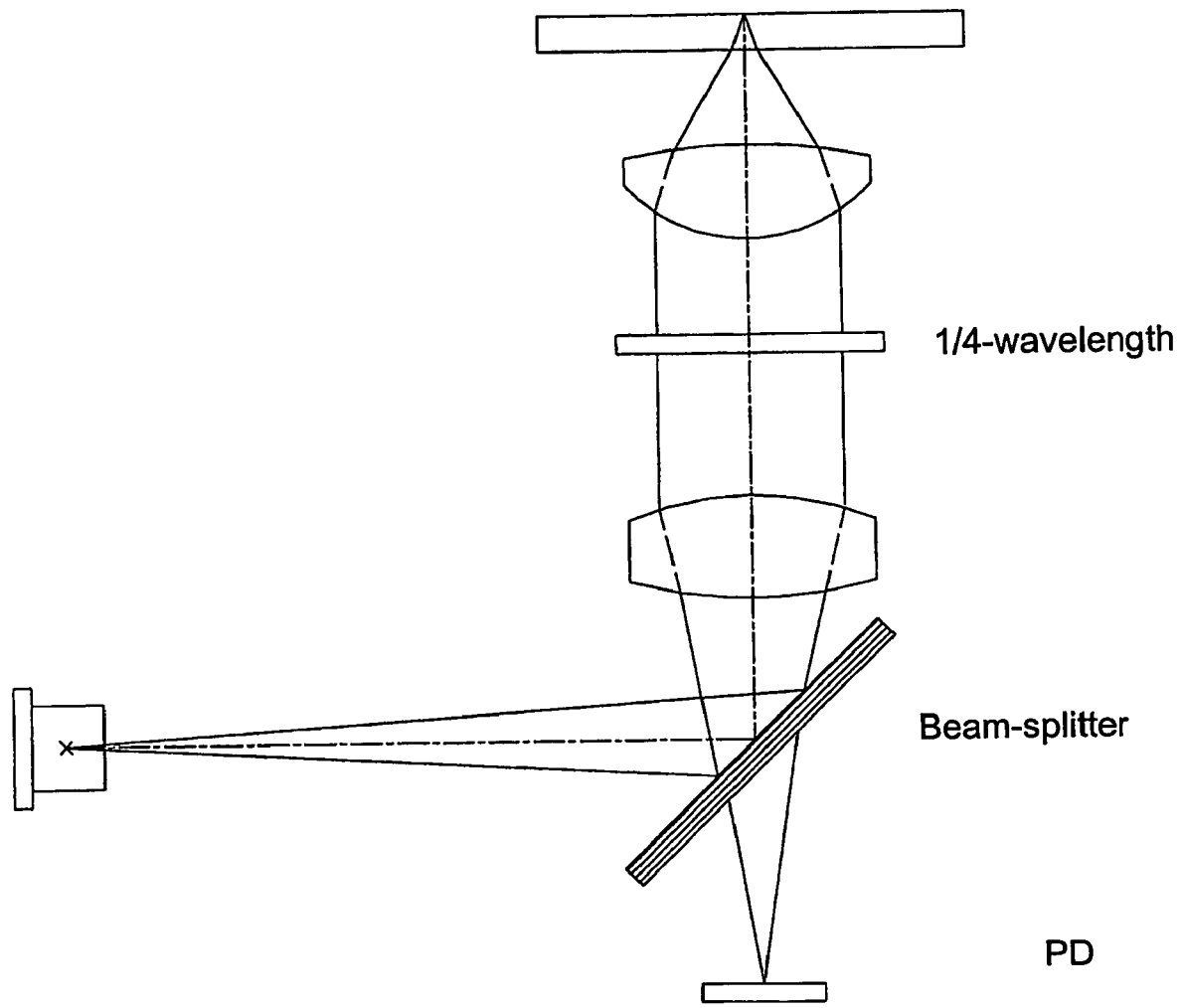
FIG. 3 shows an optical pick-up system comprising a beam splitter covered with coating.
Figure 4:
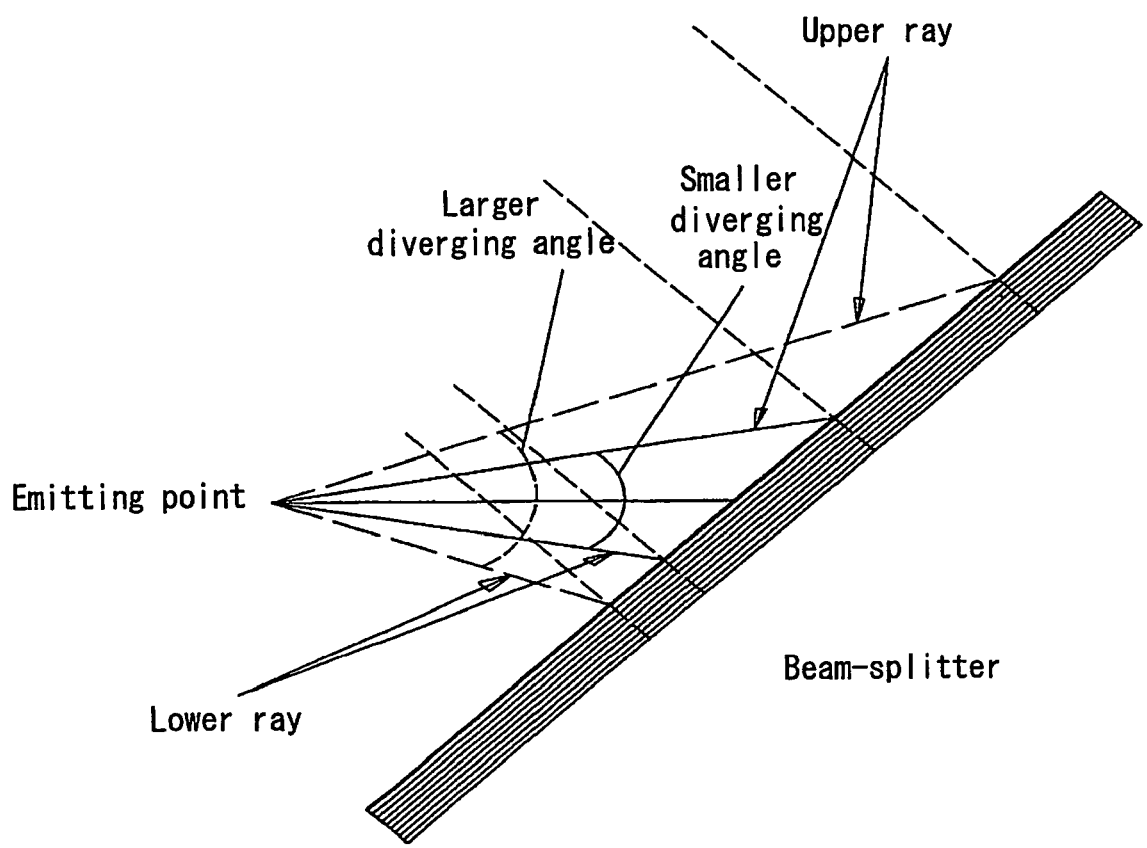
FIG. 4 shows a beam splitter covered with coating.
Figure 5:
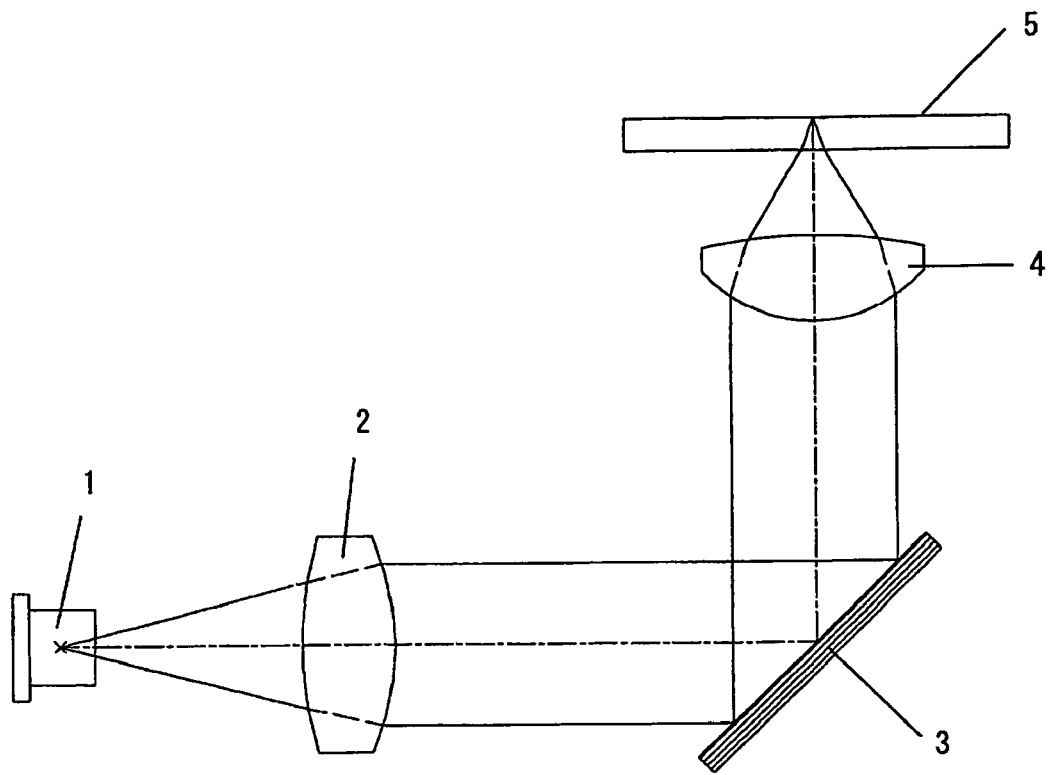
FIG. 5 shows a typical optical pick-up system.
Figure 6:
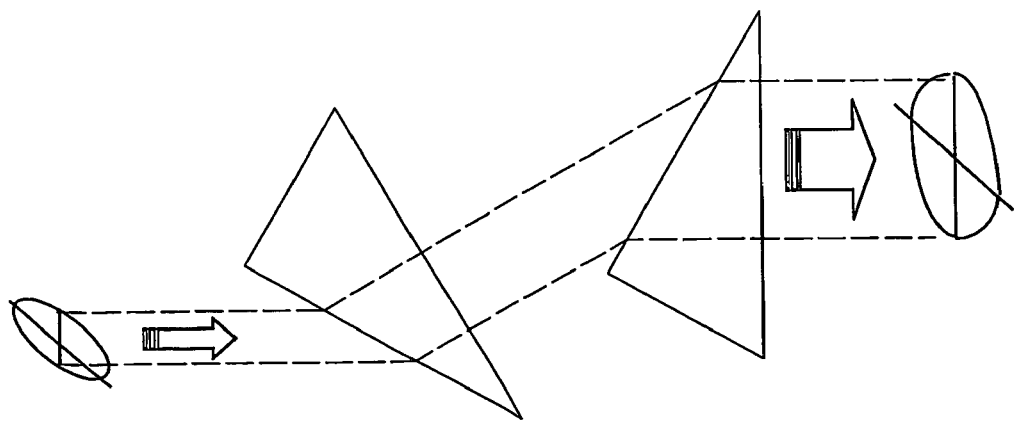
FIG. 6 shows a system in which an elliptical cross-section of a beam is converted into a circular cross-section through a combination of prisms.
Figure 7:
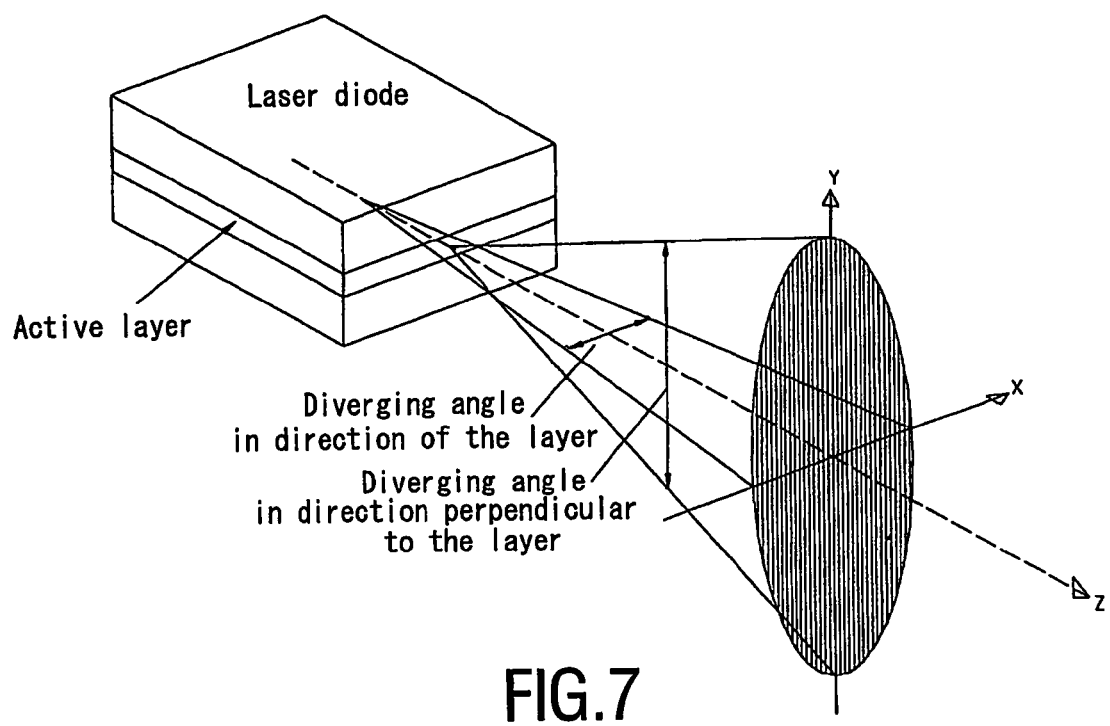
FIG. 7 shows a cross-section of a semiconductor laser.

The reason why the optical pick-up system requires a pre-collimator function will be described with reference to FIGS. 3 and 4. In FIG. 3, a semi-transparent folding mirror is used as beam splitter and is arranged between a beam splitter covered with coating and the collimator. The beam splitter covered with coating has light either reflect on or pass through it, depending on the direction of polarization of the light. Light having reflected on the beam splitter covered with coating, then passes through the collimator, a ¼ wave length plate and an objective lens before being focused on an optical information-recording medium. Light having reflected on the optical information-recording medium, passes through the objective lens and then passes through the ¼ wave length plate, so that the direction of polarization of the light rotates by 90 degrees. Then the light passes through the beam splitter to be directed to a photo detector (PD). When light reflects on the beam splitter on its path towards the optical information-recording medium and passes through the beam splitter on its path from the optical information-recording medium, characteristics of the beam splitter covered with coating depend on angles of incidence of the light beam on the beam splitter covered with coating. A large difference in angles of incidence produces a greater change in phase and a change in reflectivity of the coating. For example, when light is made to reflect on the beam splitter covered with coating as shown in FIG. 4, a larger diverging angle makes a lager difference in angles of incidence on the beam splitter covered with coating, between "the upper light" and "lower light" from the semiconductor laser. Such a larger difference in angles of incidence causes a problem that phase and energy of the light are not uniform within the beam spot. In order to avoid this problem, a pre-collimator for decreasing a diverging angle, and thus a difference in angles of incidence of the light on the beam splitter covered with coating, must be positioned between the semiconductor laser and the beam splitter.

Figure 8:
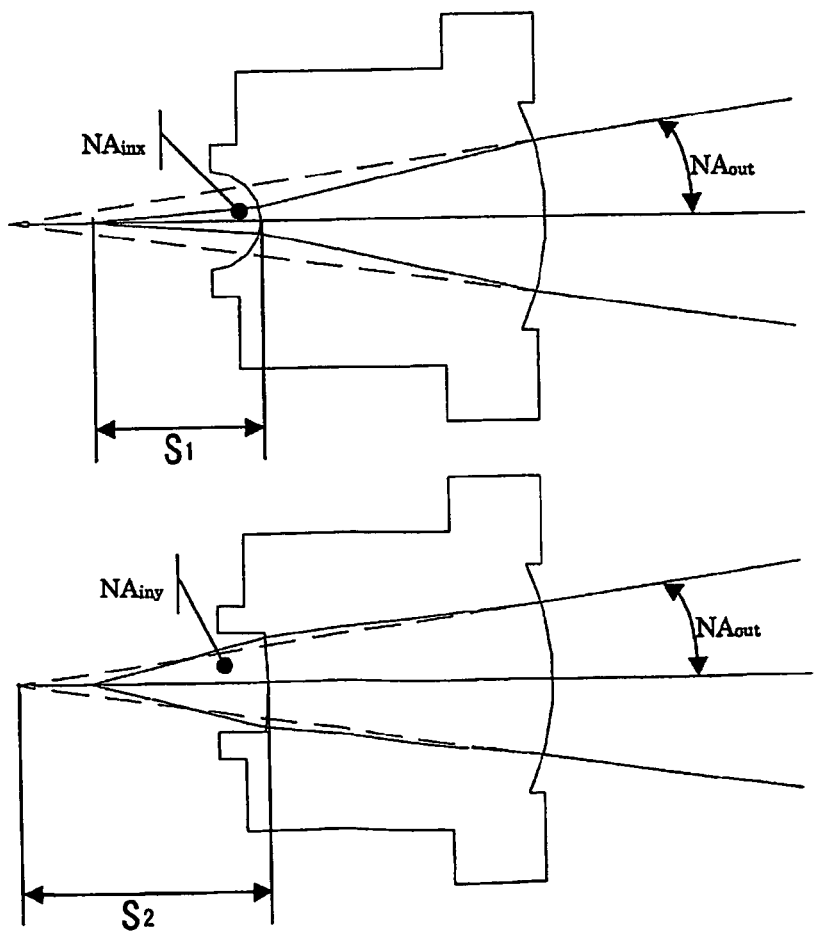
FIG. 8 shows a relationship between numerical apertures at the entry and exit surfaces of a beam-shaping optical element.

In order to provide a beam-shaping optical element according to the present invention with a pre-collimator function, a distance between the emitting point of the semiconductor laser and the entry surface of the element should be made smaller than a distance between the imaginary point of the element and the entry surface of the element. For this purpose, in designing the element the following condition is added. More specifically, in a designing procedure to be described below with reference to FIG. 15, the following condition is added.

$$(NA_{out}/2)(1/NA_{inx}+1/NA_{iny})<1$$

where $NA_{out}$ is a numerical aperture at the exit surface and $NA_{inx}$ and $NA_{iny}$ are numerical apertures at the entrance surface in the X and Y axes, which are orthogonal to each other and the optical axis. As shown in FIG. 8, a distance $S_1$ between the emitting point of the semiconductor laser and the entry surface of the element is made smaller than a distance $S_2$ between the imaginary point of the element and the entry surface of the element.

The spot focused on the optical information-recording medium is arranged to have a desired size by adjusting a value of numerical aperture of the objective lens 13, so that recording and reproducing is properly performed on the optical information-recording medium 14. Since the beam is shaped in such a way that its cross-section is made substantially circular, the spot is also made substantially circular. Further, since the cross section of the beam has been made into a substantially circular shape before the beam enters the element 11 for converting light from the semiconductor laser 10 into parallel or converging light, energy loss of the beam incurred until the beam forms the spot, is minimized. Further, a light beam with minimum aberration is realized. Thus, the resultant higher energy efficiency of the beam enables higher recording density and higher speed in recording and reproducing of the optical information-recording medium 14.

The beam-shaping optical element 9 according to the present invention will be described below. The beam-shaping optical element 9 according to the present invention is provided with at least one surface represented by Equation (3) below. Although the first term of Equation (3) is identical with that of Equation (2), the second and succeeding correction terms are different from those of Equation (2). The correction terms of Equation (3) are characterized in that terms comprising X and those comprising Y can be corrected by independent factors.

$$Z = \frac{c_x x^2 + c_y y^2}{1 + \sqrt{1 - (1 + k_x)(c_x^2 x^2) - (1 + k_y)(c_y^2 y^2)}} + \sum_{i=1}^{m} A_i x^{2i} + \sum_{i=1}^{m} B_i y^{2i} \quad \text{Eq. (3)}$$

where $c_x$ and $c_y$ are the curvature of the surface in the direction of the X axis and Y axis, respectively, and $k_x$, $k_y$ and the correction factor $A_i$ and $B_i$ are constants.

Figure 9:
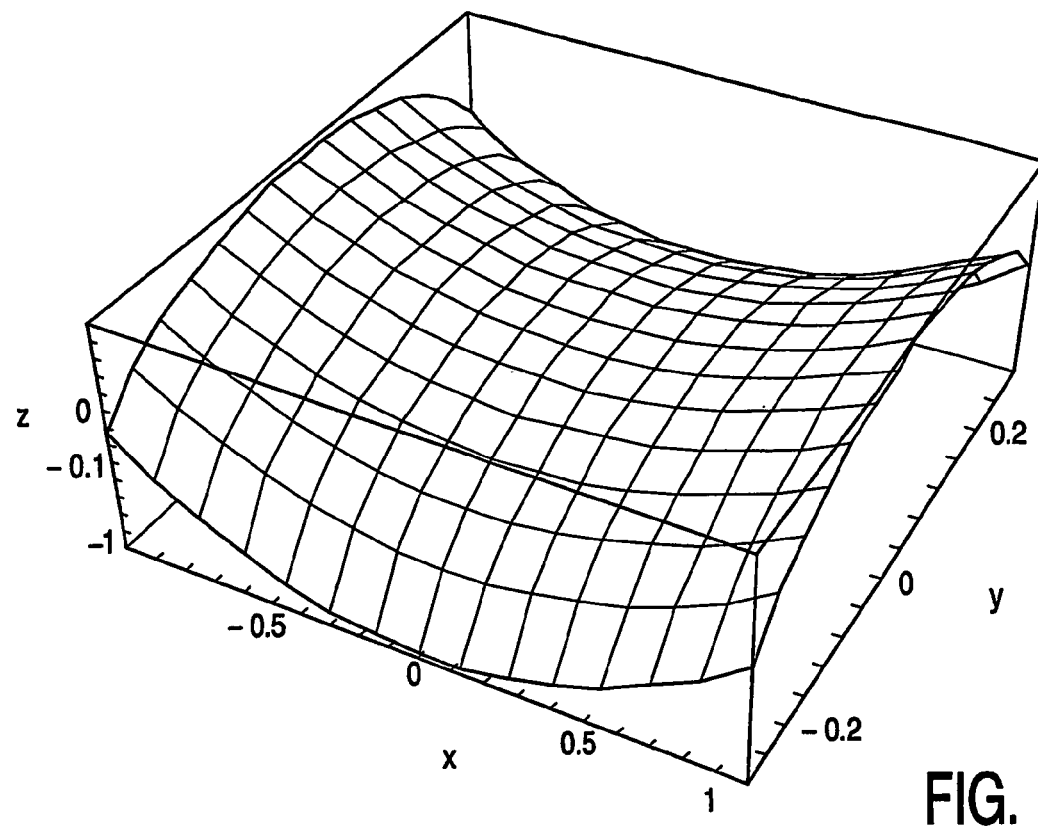
FIG. 9 shows an example of a shape of a surface represented by the first term alone of Equation (3)
Figure 10:
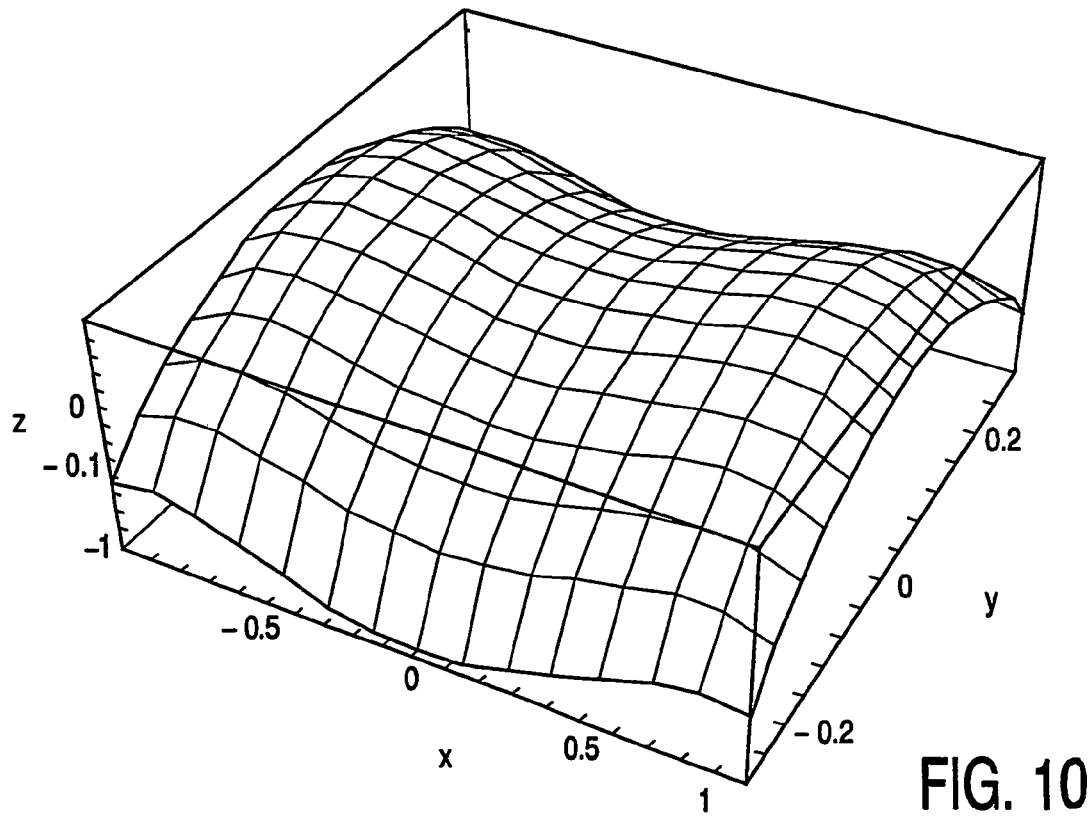
FIG. 10 shows an example of a shape of a surface represented by Equation (3)
Figure 11:
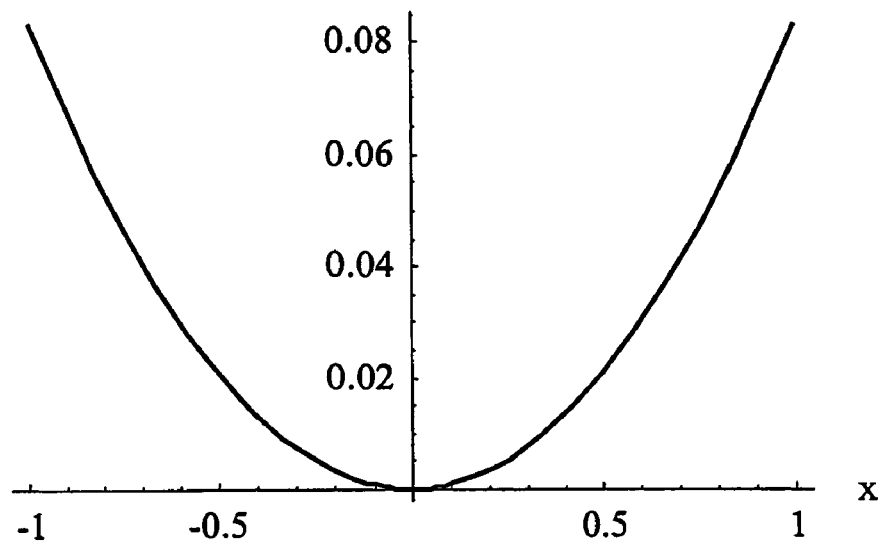
FIG. 11 shows a cross-section of the surface of FIG. 9, cut by a plane of y=0.
Figure 12:
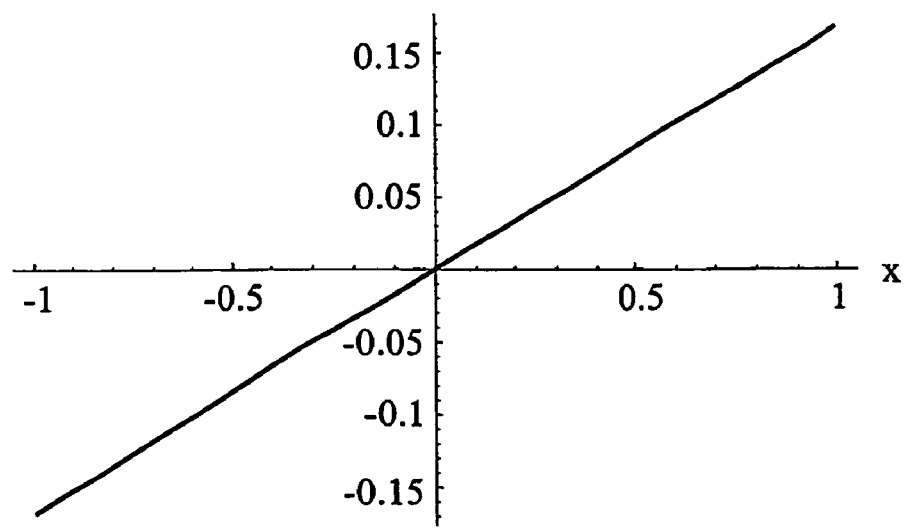
FIG. 12 shows a differential curve of the cross-sectional profile of FIG. 11.
Figure 13:
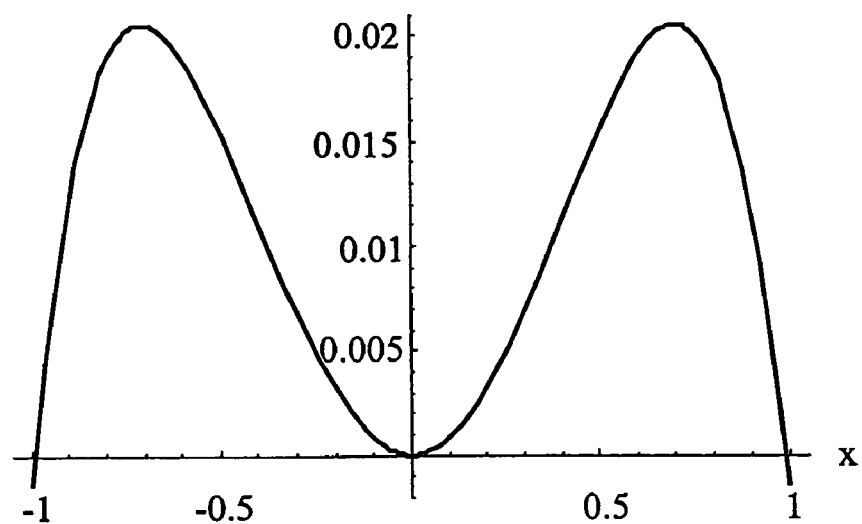
FIG. 13 shows a cross-section of the surface of FIG. 10, cut by a plane of y=0.
Figure 14:
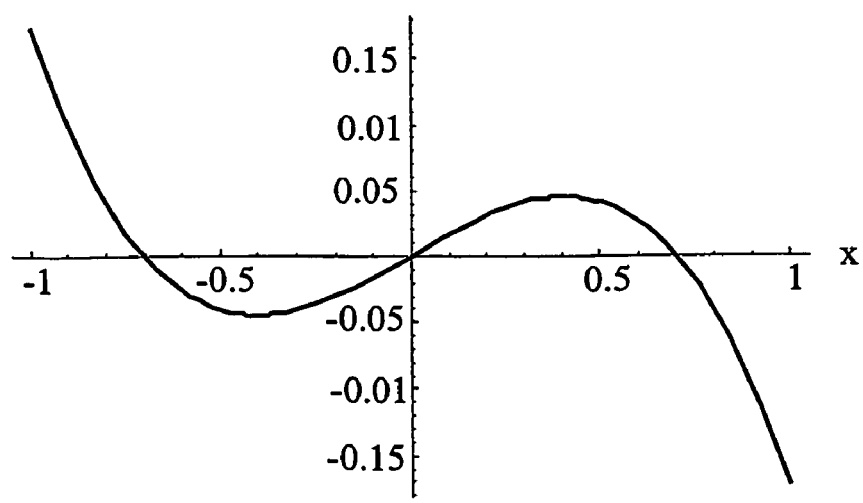
FIG. 14 shows a differential curve of the cross-sectional profile of FIG. 13.

Functions of the correction terms of Equation (3) will be described with reference to FIGS. 9 to 14. FIG. 9 shows an example of a biconic surface represented by the first term alone of Equation (3). FIG. 10 shows a surface represented by Equation (3). In FIG. 9, curvatures in X and Y directions are different from each other. In FIG. 10, the shape of the surface is complicated in X direction. FIG. 11 shows a cross-section of the surface of FIG. 9, cut by a plane of y=0. Further, FIG. 12 shows a curve representing a differential function of the cross-sectional profile of FIG. 11. FIG. 13 shows a cross-section of the surface of FIG. 10, cut by a plane of y=0. Further, FIG. 14 shows a differential curve of the cross-sectional profile of FIG. 13.

As seen from the drawings mentioned above, since correction terms comprising X and those comprising Y can be corrected by independent factors, a surface can be designed with more flexibility. Accordingly, an element generating less aberration while the cross-section of the beam is made substantially circular, can be designed. On the other hand, since the second and succeeding terms of Equation (2) cannot be corrected by independent factors for X and Y, flexibility in designing is less than in Equation (3).

Figure 15:
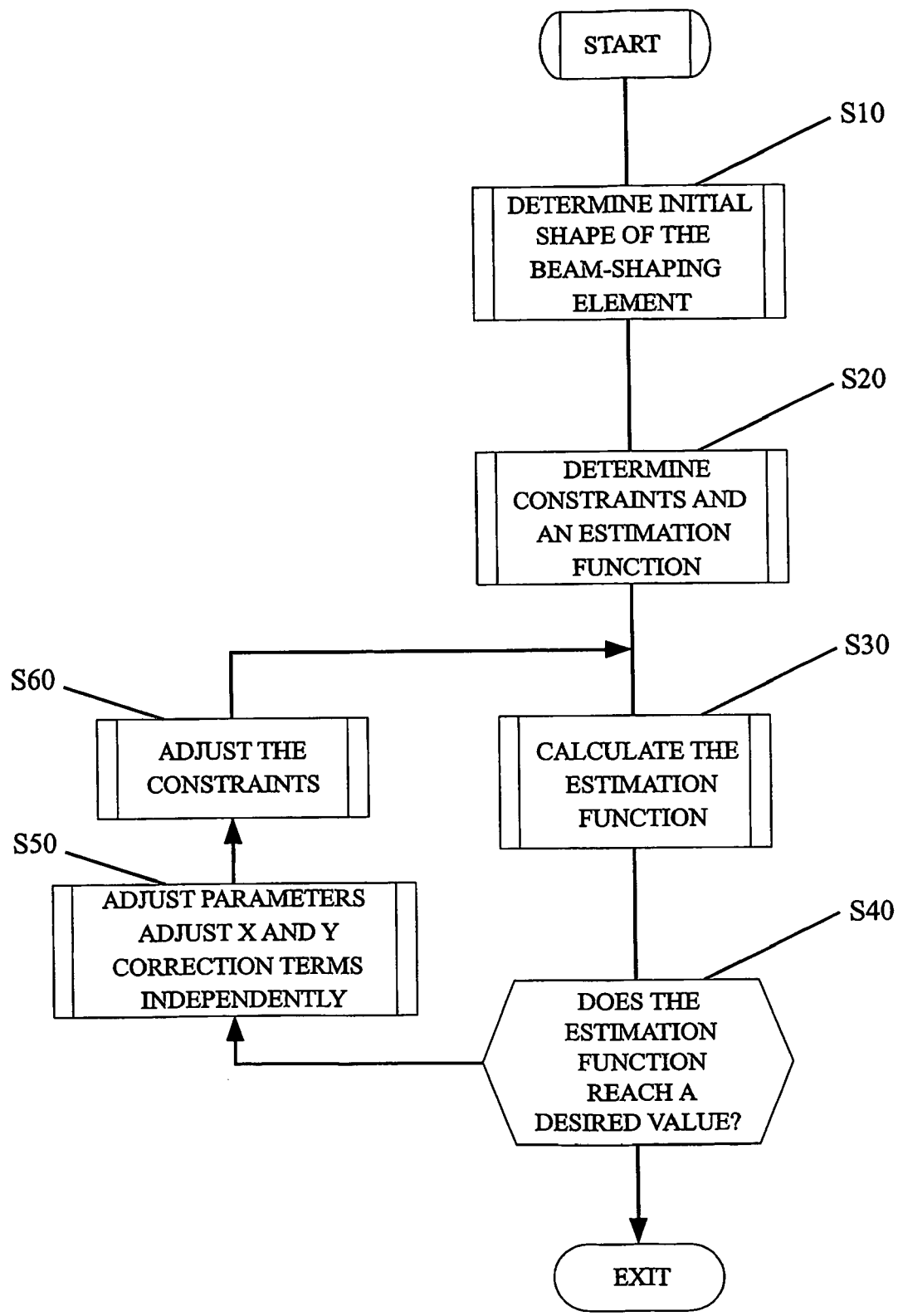
FIG. 15 shows a method for designing a beam-shaping optical element, according to the present invention.

The outline of the method for designing a beam-shaping optical element, according to the present invention, will be described below with reference to FIG. 15. In designing, a commercial software for simulating optical behavior of the beam-shaping optical element (for example, Zemax from Focus Software Inc.) can be used. In step S10, an initial shape of the beam-shaping optical element is determined. The initial shape of the beam-shaping optical element is determined, based on a shape of the cross-section of the beam from the semiconductor laser 10, a numerical aperture of the element 11 for converting light from the semiconductor laser 10 into parallel or converging light and the like. In step S20, constraints and a merit function are determined. The constraints comprise states of a beam at the entry and exit surfaces of the beam-shaping optical element or the like. The merit function is, for example, that for aberration of the beam. In step S30, a value of the merit function is obtained under the constraints. In step S40 it is determined whether or not the value of the merit function has reached a desired value. If the function has reached the desired value, the process finishes. If the value has not reached the desired one, one or more parameters of Equation (3) is adjusted in step S50. According to the present invention, correction terms comprising X and those comprising Y can be corrected by independent factors, so that parameters can be advantageously adjusted with more flexibility. Further, in step S60, the constraints are adjusted if necessary. The process goes back to step S30 and the steps are repeated until the merit function reaches the desired value.

Further, a program for implementing the above-mentioned designing process can be created. The design program may incorporate a program for simulating optical behavior of the beam-shaping optical element. The design program is arranged to have a computer perform each of the steps shown in FIG. 15. Further, the design program may be provided with an interactive function, so that determination of the constraints and the merit function in step S20, adjustment of parameters in Step S50 and adjustment of the constraints in step S60 can be performed through interaction with the designer. In this case, a variety of constraints and merit functions may be stored in a storing device of the computer and displayed for the designer, so that the designer can select any of them. Further, ways of adjusting parameters in step S50 and ways of adjusting constraints in step S60 may be stored in a storing device of the computer in various manners and displayed for the designer, so that the designer can select any of them.

An example of a shape of the beam-shaping optical element obtained by the process mentioned above, will be described in Table 1. In the example, both entry and exit surfaces are represented by Equation (3). Thus, Table 1 shows values of factors of Equation (3).

TABLE 1

| $R_x$ | $R_y$ | $k_x$ | $k_y$ | $A_4$ | $A_6$ | $B_4$ | $B_6$ |
|---|---|---|---|---|---|---|---|
| Surface 1 (Entry surface) | | | | | | | |
| 6.03 | −0.60 | 0.000 | 1.710 | −0.0084 | −0.0010 | 1.0289 | 6.5073 |
| Surface 2 (Exit surface) | | | | | | | |
| −7.60 | −2.37 | 0.809 | 0.044 | 0.0033 | −0.0002 | 0.0006 | −0.0007 |

Center thickness: 2.7 mm

Further, a shape in YZ cross-section comprising the optical axis and that in XZ cross-section comprising the optical axis of the beam-shaping optical element having surfaces represented by Table 1, are shown in FIG. 1. A shape of the entry surface in YZ cross-section 7a has a negative curvature, while a shape of the entry surface in XZ cross-section 7b has a positive curvature. Such curvatures permit beam-shaping from an elliptical cross-section to a substantially circular one.

In the example, the beam-shaping optical element is made of olefin copolymer, although it can be made of other plastics.

Aberrations of the beam-shaping optical element of the example as designed using Equation (3) are shown in Table 2, in comparison with those of beam-shaping optical elements having surfaces represented by Equations (1) and (2). The beam-shaping optical elements having surfaces represented by Equations (1) and (2) have been designed in a similar process with that shown in FIG. 15.

TABLE 2

| | λRMS | | | | | | | |
|---|---|---|---|---|---|---|---|---|
| | SA | $6^{th}$SA | $8^{th}$SA | AS | $4^{th}$AS | $6^{th}$AS | Quadratic AS | Total |
| Eq. (3) | 0.0000 | 0.0003 | 0.0001 | 0.0002 | 0.0000 | 0.0000 | 0.0000 | 0.0004 |
| Eq. (1) | 0.0090 | 0.0001 | 0.0028 | 0.0020 | 0.0002 | 0.0005 | 0.0100 | 0.0142 |
| Eq. (2) | 0.0013 | 0.0012 | 0.0006 | 0.0013 | 0.0008 | 0.0000 | 0.0004 | 0.0029 |

In Table 2, "SA" represents spherical aberration and "AS" represents astigmatic aberration. "Quadratic AS" represents quadratic astigmatic aberration. "Total" represents wave aberration. Any aberration is given as the root-mean-square value in units of λ. Aberrations caused by the beam-shaping optical element according to the present invention are remarkably reduced compared with those caused by the beam-shaping optical elements having surfaces represented by Equations (1) and (2).

The correction terms of Equation (3) permit more flexibility in designing surfaces, so that a beam-shaping optical element with minimum aberration can be realized.

The invention claimed is:

1. A beam-shaping optical element having an entrance surface, an exit surface located opposite thereto and an optical axis, wherein the optical axis coincides with the Z-axis of a three-axis rectangular XYZ system of coordinates, and at least one of the entrance surface and the exit surface is represented by a mathematical equation comprising a term representing a non-rotationally symmetric aspherical profile and correction terms, each correction term being a function of either variable X or Y, at least one of the correction terms being a function of variable X and at least one of the correction terms being a function of variable Y.

2. The beam-shaping optical element according to claim 1, wherein the at least one correction term comprising a function of variable X alone comprises a power of X, multiplied by a correction factor and the at least one correction term comprising a function of variable Y alone comprises a power of Y, multiplied by a correction factor.

3. The beam-shaping optical element according to claim 1, wherein the at least one of the entrance surface and the exit surface is represented by the mathematical equation $$Z = \frac{c_x x^2 + c_y y^2}{1 + \sqrt{1 - (1+k_x)(c_x^2 x^2) - (1+k_y)(c_y^2 y^2)}} + \sum_{i=1}^{m} A_i x^{2i} + \sum_{i=1}^{m} B_i y^{2i}$$

in which $c_x$ and $c_y$ are the curvature of the surface in the direction of the X axis and Y axis, respectively, and $k_x$, $k_y$ and the correction factor $A_i$ and $B_i$ are constants.

4. The beam-shaping optical element according to claim 3, in which the values of $c_x$ and $c_y$ are substantially different.

5. The beam-shaping optical element according to claim 3, in which Ai is non-zero for at least one value of i and $B_j$ is non-zero for at least one value of j.

6. The beam-shaping optical element according to claim 1, in which at least one of the entrance and exit surfaces has a shape for minimizing the wave front aberrations of a light beam from a radiation source having passed through the beam-shaping optical element.

7. The beam-shaping optical element according to claim 1, wherein an elliptical cross-section of a beam supplied by a radiation source is converted into a substantially circular cross-section.

8. The beam-shaping optical element according to claim 1, positioned between a semiconductor laser and an optical element for converting a beam from the semiconductor laser into a parallel, diverging or converging light beam.

9. The beam-shaping optical element according to claim 1, wherein a distance from the emitting point of a semiconductor laser to the entrance surface of the element is smaller than a distance from the image of the emitting point formed by the beam-shaping optical element to the entrance surface and with the image located in the object space.

10. The beam-shaping optical element according to claim 1, wherein the mathematical equation $(NA_{out}/2)(1/NA_{inx}+1/NA_{iny})<1$ is satisfied, where $NA_{out}$ is a numerical aperture at the exit surface and $NA_{inx}$ and $NA_{iny}$ are numerical apertures at the entrance surface in the X-Z plane and Y-Z plane, respectively.

11. The beam-shaping optical element of claim 1, wherein at least one of the correction terms is adjusted to a merit function to approach the desired value.

12. The beam-shaping optical element of claim 11, wherein the merit function is for a wave front aberration.

13. The beam-shaping optical element of claim 11, wherein a value of the merit function is based on a first vergence of a first beam at the entrance surface and a second vergence of a second beam at the exit surface.

* * * * *